United States Patent Office 2,774,572
Patented Dec. 18, 1956

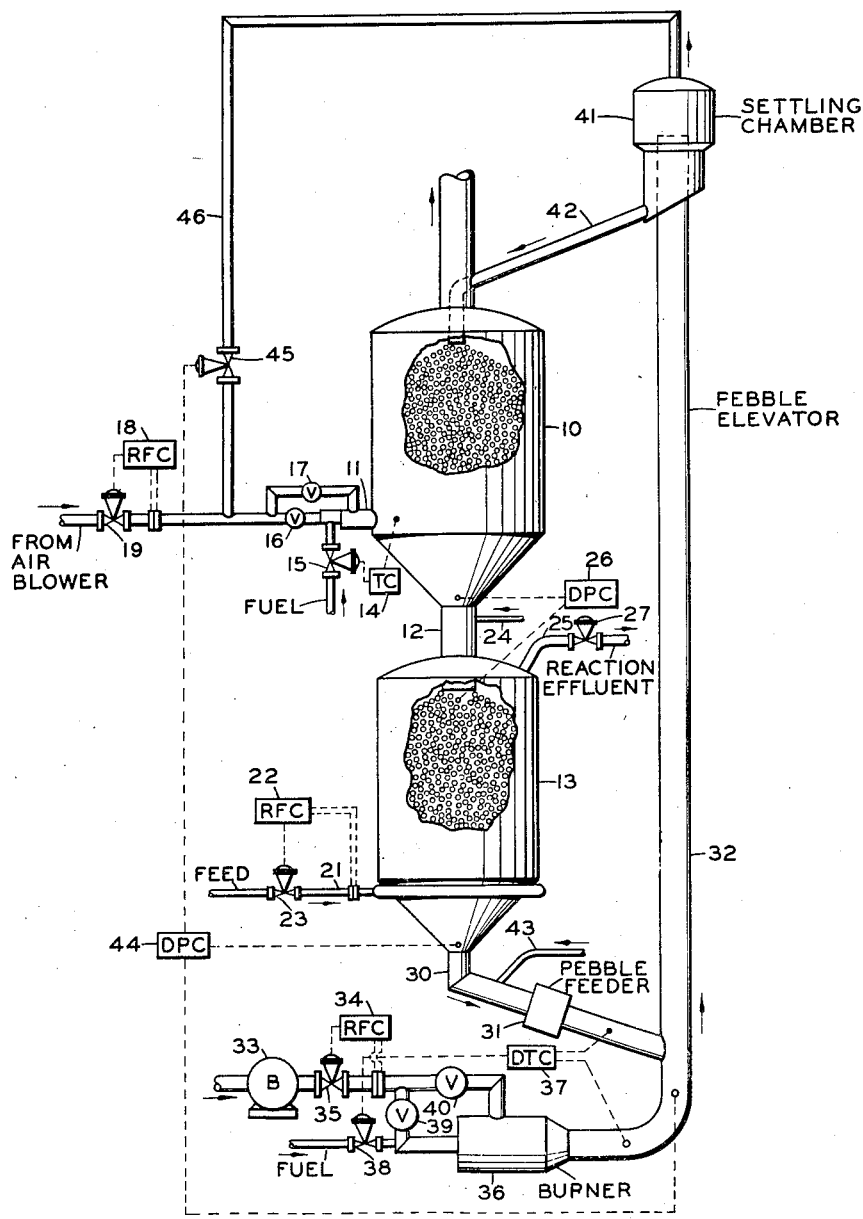

2,774,572

IMPROVED PEBBLE HEATER

Robert R. Goins, Bartlesville, Okla., assignor to Phillips Petroleum Company, a corporation of Delaware Application November 5, 1951, Serial No. 254,965

4 Claims. (Cl. 257—2)

This invention relates to an improved means for effecting heat transfer in pebble heater type apparatus. In one aspect of the invention it relates to an improved means for effecting chemical conversion in pebble heater type apparatus. In another aspect of the invention it relates to an improved pebble heater type apparatus whereby a worthwhile saving of compressed air, fuel and seal steam is effected.

Besides being useful for the production of superheated steam, pebble heater type apparatus is finding increasing favor in effecting chemical reactions continuously at temperatures of the order 1000 to 3500° F., and in some cases as high as 4000° F. The process and apparatus are particularly advantageous as applied to hydrocarbon conversion reactions, such as thermal and catalytic cracking, reforming, dehydrogenation, dehydrocyclization or aromatization and the like. The contact material can have catalytic properties which promotes the desired hydrocarbon conversion reaction, or it can be merely a heat transfer material. In both instances the contact material is circulated in the form of a relatively compact bed of downwardly moving solid particles through an upper heating zone where it is contacted with hot gases and lower conversion zone where the desired conversion reaction takes place.

Preferably the contact material employed is in the form of small substantially spherical particles. Their size, whether spherical or of other regular or irregular shape, is sufficient that an excessive pressure drop will not result when beds of substantial depth are employed in the heating and conversion zones. It is a further requirement, when a gas lift is employed rather than a mechanical elevator, that the solid particles be sufficiently small to facilitate their transportation by said gas lift in that part of the circuit through which they flow between the conversion and heating zones.

The ability of the solid particles, or pebbles, to be transported by gas lift can be calculated by known formulas, taking into account such factors as their average density, size and shape and the density and velocity of the transporting fluid. To be readily transported by gas lift, to avoid excessive pressure drop in the beds, and to effectively transfer heat to materials undergoing conversion, pebbles in the size range of ⅛ inch to ¾ inch diameter, preferably ³⁄₁₀ to ½ inch diameter, are employed. Pebbles made of alumina, beryllia, magnesia, thoria, zirconia, mullite, periclase and other materials, preferably refractory materials, may be used. The presence in the system of substantial quantities of excessively fine particles of a powdery or dusty nature should be avoided so that they will not form "clinkers" or excessively fill the voids between the larger pebbles and give an excessive pressure drop for the reactants and combustion gases passing through the zones. For these reasons, the pebbles charged to the system are preferably of substantially uniform or well graded size and any excessive quantity of fines produced by attrition of the larger pebbles within the system is preferably removed therefrom and replaced by larger pebbles. To avoid excessive attrition, the pebbles should have good structural strength to withstand the extremely high temperature and shock conditions of temperature change, impact and abrasion to which they are subjected in the system. The use of substantially spherical pebbles will greatly assist in avoiding excessive attrition.

The circulation of pebbles through the system is effected, in part, by gravitational descent as a relatively compact mass from an upper pebble heating zone where the pebbles are heated to a temperature in the range of 1000 to 3500° F. by contact with hot gases, usually combustion gases from a burner, down through a conduit, or throat into a conversion or heat transfer zone where they are directly and usually countercurrently contacted with a stream of hydrocarbon material at correlated flow rates such that said hydrocarbon material is heated by heat contained in said pebbles to a desired conversion temperature and subjected to the catalytic effect of said pebbles, if any. From the lower part of said conversion zone pebbles which have given up a portion of their heat to the material undergoing conversion pass through a duct and pebble feeder into the lower portion of an elevation zone through which is passed a gas at flow rate sufficient to elevate said pebbles up into a pebble settling zone and hopper from whence they complete the cycle back to said pebble heating zone. As disclosed and claimed in the copending application of Leonard P. Meade Serial Number 230,865, filed June 11, 1951, the lifting fluid is at the approximate temperature of the pebbles being elevated to avoid thermally shocking them during their concurrent flow upwards to the settling chamber.

A special feature of my invention resides in the manner and means whereby pressures throughout the system are balanced. It is usually desirable to prevent leakages of heating gases from the heating zone into the conversion zone or, conversely, reaction effluent from the conversion zone into the heating zone, due to pressure differentials existing between the two zones. This is accomplished by injecting an inert gas such as steam into the duct or throat between the two zones, and/or by controlling the rate of flow of reaction effluent from the conversion zone in response to a pressure differential between the two zones. Another point in the system where it is also desirable to prevent gas leakages is between the bottom of the conversion zone and the lower part of the pebble elevating zone. I have found that when employing a gas as the elevating medium the pressures existing in the bottom of said conversion zone and the bottom of said elevating zone can be substantially balanced by controlling the rate of flow of gaseous effluent from the pebble settling zone, thus effecting a worthwhile saving in the amount of seal steam which would otherwise be required and concomitantly diminishing thermal shock to the pebbles coming in contact with said seal steam. Still further, I have found that if the hot gaseous effluent from said pebble settling zone as thus controlled is employed as part of the heating gas, or combustion air as the case may be, the sensible heat therein can be utilized with a further saving of compressed air and fuel which would otherwise be required.

It is therefore an object of this invention to provide an improved means for effecting heat transfer in pebble heater type apparatus.

Another object of this invention is to provide an improved means for effecting chemical conversion in pebble heater type apparatus.

A further object of this invention is to provide an improved pebble heater type apparatus whereby a worthwhile saving of compressed air, fuel and seal steam is effected.

Other objects and advantages will be apparent to those skilled in the art from the accompanying disclosure and discussion.

The accompanying drawing which is an elevation view partly cut away, portrays diagrammatically one embodiment of my invention.

Referring now to the drawing in detail, substantially spherical pebbles ⅛ inch to ¾ inch, preferably ³⁄₁₀ inch to ½ inch, in diameter are gravitated as a relatively compact mass downwardly from an upper pebble heating zone 10, where they are heated to a temperature in the range of 1000 to 3500° F. by contact with hot combustion gases from burner 11, through pebble duct 12 into conversion zone 13. The temperature to which the pebbles are heated can be automatically controlled by means of temperature controller 14 which actuates motor valve 15 in the fuel line to burner 11. It is also possible to adjust the temperature by controlling primary air valve 16 or secondary air valve 17. Combustion air for burner 11 is supplied from a blower, not shown, the flow therefrom being automatically controlled by means of flow controller 18 which actuates motor valve 19. In conversion zone 13 hot pebbles are directly and countercurrently contacted with hydrocarbon material undergoing conversion which enters said zone through line 21 at correlated flow rates such that said hydrocarbon material is heated by heat contained in said pebbles to a desired conversion temperature and for a desired time, also receiving the benefit of any catalytic effect which may be exercised by the pebbles. Assuming a constant circulation rate for the pebbles, the flow of feed material can be automatically controlled by means of rate of flow controller 22 which actuates motor valve 23 in feed line 21. Leakage of combustion gases from the pebbles heating zone or gaseous reaction product from the conversion zone caused by small differences in pressure between the bottom of said pebble heating zone and the top of the conversion zone can be alleviated by the injection through line 24 into pebble duct 12 of an inert gas such as steam. In order to keep said pressure differences small, the flow of reaction effluent leaving conversion zone 13 through line 25 may be automatically controlled by means of differential pressure controller 26 which actuates motor valve 27 therein. It is also possible to adopt such automatic control devices to line 24.

Pebbles which have given up part of their heat to the material undergoing conversion leave conversion zone 13 through pebble duct 30 and pebble feeder 31 passing into pebble elevating zone 32, usually at a temperature greatly less than the conversion tmeperature. As disclosed and claimed in the above-cited copending application of Leonard P. Meade, in order to avoid thermally shocking the pebbles entering pebble elevating zone 32, the lifting fluid is heated to the approximate temperature of said pebbles. A preferred way of operating is to use air which is supplied by blower 33, the flow of said air being controlled by rate of flow controller 34 which actuates motor valve 35, the air being heated by means of burner 36. The temperature of the lift gas is automatically adjusted to the approximate temperature of the pebbles entering the elevating zone by means of differential temperature controller 37 which actuates motor valve 38 in the fuel line to burner 36. This represents a preferred method of temperature control of said lift gas, but it is also possible to control primary air valve 39 or secondary air valve 40. The hot lift gas is passed upwardly through pebble elevating zone 32 at a velocity sufficient to maintain the desired pebble circulation rate thus elevating pebbles up to pebble settling zone and hopper 41 from whence they pass through conduit 42 to pebble heating zone 10 thereby completing their cycle.

I have found that a worthwhile saving in the amount of seal steam which is normally passed through line 43 to alleviate gas leakages due to pressure differences between the bottom of conversion zone 13 and the bottom of pebble elevating zone 32 can be effected by controlling the flow of gaseous effluent from pebble settling zone 41. The gaseous effluent from pebble settling zone 41 includes gas which may leak through the hopper and conduit 42. When the stack gases from heating zone 10 are vented to the atmosphere as shown, a higher pressure existing in settling zone 41 than the top of heating zone 10 will cause lift gas to flow through conduit 42. In accordance with my invention I keep conduit 42 completely filled with pebbles and select the diameter and length thereof to substantially prevent the flow of lift gas therethrough while at the same time allowing the desired pebble circulation rate. A loss of lift gas through conduit 42 of 10 percent is permissible. An alternate but much less desired method of preventing loss of lift gas through conduit 42 could comprise a star valve-type pebble feeder connected therein to form a substantial gas seal. Assuming then that the flow of gas through conduit 42 has been thus restricted, the flow of remaining gaseous effluent from settling zone 41 can be automatically controlled by means of differential pressure controller 44 which actuates motor valve 45 in effluent line 46 in response to a predetermined small difference in pressure between the bottom of conversion zone 13 and pebble elevating zone 32. In order to accomplish a maximum saving in seal steam a differential pressure of zero is desirable, but a maximum difference of 0.5 p. s. i., in the direction of pebble flow, is tolerable. That is, the pressure in the bottom of the conversion zone should be greater than that existing in the bottom of the pebble elevating zone so that if no seal steam is used at all and a pressure differential does exist there will not be a leakage of lift air into the conversion zone. A preferred operating range of pressure differences is 0 to 0.2 p. s. i.

While I have shown in the drawing the use of the effluent gas from settling zone 41 as part of the combustion air to burner 11 to heat the pebbles in zone 10, the same saving in seal steam can be accomplished by venting said effluent gas to the atmosphere, provided, of course, that it is controlled as hereinbefore described. However, I prefer to operate as indicated in the drawing for I have found that by so doing a substantial saving in compressed air and fuel, which would otherwise be required, is effected. In operating in this manner it is necessary that the pressure of the effluent gas leaving settling zone 41 be sufficient to allow flow into the bottom of heating zone 10. In this regard it would be preferable to have the effluent gas flow through line 46 and valve 45 and pass directly into the secondary air supply to burner 11 by-passing valve 17 thus saving an added pressure drop across said valve 17. It is also within the broad concept of my invention to operate as just previously described without motor valve 45 since the pressure in the bottom of the heating zone will control the rate of flow of effluent gas to burner 11. Broadly, any method of controlling the rate of flow of gaseous effluent from pebble settling zone 41 to maintain a predetermined small pressure difference between the bottom of the conversion zone and the bottom of the pebble elevating zone is within the scope of my invention. And, by utilizing the lifting fluid, whether it be hot air, hot flue gas, or steam the aforementioned saving in compressed air or fuel or both is accomplished. One skilled in the art will apperciate, however, that it is necessary to maintain a proper flame temperature in burner 11 to heat the pebbles to the desired temperature.

*Example*

A chemical conversion process is carried out in a pebble heater type apparatus which requires a pebble circulation rate of 30,000 pounds per hour. A hot gas lift is employed which is 90 feet high and 10 inches in diameter with a pressure drop through the lift of 1.3 p. s. i. The heat release required in the heating zone is 17,000,000 B. t. u. per hour or 17,000 cubic feet per hour of 1000 B. t. u. fuel gas. The combustion air requirement at a 20:1 air to gas ratio is 340,000 S. C. F. H. or 25,800 pounds per hour. The amount of air at 1000° F. to lift 30,000 pounds of pebbles per hour is 131,400 S. C. F. H. or 10,000 pounds per hour. Approximately 354 pounds per hour of air is lost through a pebble duct 10 feet long and 7 inches in diameter connecting the pebble settling zone and hopper with the top of the heating zone. The pressure in the system at various points is as follows: the top of air lift or settling zone, 3.5 p. s. i. g.; the bottom of the air lift, 4.8 p. s. i. g.; the bottom of the conversion zone, 5.0 p. s. i. g.; the top of the conversion zone 3.0 p. s. i. g.; and the bottom of the heating zone, 3.0 p. s. i. g. The amount of air available from the air lift to supply combustion air to the heating zone is 9646 pounds per hour or 37.5 percent of the required amount. The amount of heat available in 9646 pounds of air at 1000° F. is 2,260,000 B. t. u. constituting 13.3 percent of the heat required in the heating zone. Also, seal steam at the bottom of the conversion zone is nearly eliminated because only 0.2 p. s. i. pressure drop is encountered.

While this invention has been described and exemplified in terms of its preferred embodiments it will be appreciated that modifications may be made without departing from the invention.

I claim:

1. In a heat transfer apparatus comprising a pebble heating chamber, a heat transfer chamber located below said heating chamber, means for gravitating pebbles downwardly through said chambers, and a gas lift pebble elevating means having a gas entry, a pebble entry, a gas exit and a pebble exit adapted to remove pebbles from the bottom of said heat transfer chamber and to deliver said pebbles to the top of said heating chamber, the improvement comprising, a first pressure determining means operatively connected to the bottom of said heat transfer chamber; a second pressure determining means operatively connected to the pebble entry of said gas lift means; control valve means operatively connected to the gas exit of said gas lift means; and means operatively connected to said first and second pressure determining means and to said control valve so as to control said valve in response to the differential in pressure existing between said first and second pressure determining means.

2. An improved apparatus for effecting heat transfer at elevated temperatures comprising pebble heating chamber having a pebble inlet in the upper portion, a pebble outlet in the lower portion, a gas outlet and a fuel and air inlet; a heat transfer chamber positioned below said heating chamber having a pebble inlet in the upper portion in communication with the pebble outlet of said heating chamber, inlet means for material to be heated, outlet means for heated material, and a pebble outlet in the lower portion; a gas lift elevator means having a gas inlet at the bottom, a pebble inlet above said gas inlet communicating with said heat transfer chamber pebble outlet, a gas outlet at the top of said gas lift means, and a pebble outlet means at the top of said gas lift means and in communication with the pebble inlet of said heating chamber; a control valve means in communication with the gas lift gas outlet; means for introducing gas to said gas lift gas inlet; a first pressure determining means positioned adjacent said heat transfer chamber pebble outlet; a second pressure determining means positioned adjacent said gas lift pebble inlet means; and a differential pressure controller operatively connected to said first and second pressure determining means and to said gas lift gas outlet control valve.

3. In a heat transfer apparatus comprising a pebble heating chamber having therein means for burning fuel and air, a heat transfer chamber located below said heating chamber, means for gravitating pebbles downwardly through said chambers, and a gas lift pebble elevating means having a gas entry, a pebble entry, a gas exit and a pebble exit, adapted to remove pebbles from the bottom of said heat transfer chamber and to deliver said pebbles to the top of said heating chamber, the improvement comprising, a first pressure determining means operatively connected to the bottom of said heat transfer chamber; a second pressure determining means operatively connected to the pebble entry of said gas lift means; conduit means connecting the gas exit of said gas lift means to said means for burning fuel and air in said pebble heating chamber; control valve means in said conduit means; and means operatively connected to said first and second pressure determining means and to said control valve so as to control said valve in response to the differential in pressure existing between said first and second pressure determining means.

4. An improved apparatus for effecting heat transfer at elevated temperatures comprising a pebble heating chamber having a pebble inlet in the upper portion, a pebble outlet in the lower portion, a gas outlet, and a fuel and air inlet; a heat transfer chamber positioned below said heating chamber having a pebble inlet in the upper portion in communication with the pebble outlet of said heating chamber, inlet means for material to be heated, outlet means for heated material, and a pebble outlet in the lower portion; a gas lift elevator means having a gas inlet in the bottom, a pebble inlet above said gas inlet communicating with said heat transfer pebble outlet, a gas outlet at the top of said gas lift means, and a pebble outlet means at the top of said gas lift means and in communication with the pebble inlet of said heating chamber; conduit means connecting the gas outlet at the top of said gas lift means to the fuel and air inlet of said pebble heating chamber; a control valve in said conduit means; means for introducing gas to said gas lift gas inlet; a first pressure determining means positioned adjacent said heat transfer chamber pebble outlet; a second pressure determining means positioned adjacent said gas lift pebble inlet means; and a differential pressure controller operatively connected to said first and second pressure determining means and to said control valve in said conduit means.

References Cited in the file of this patent

UNITED STATES PATENTS

| Number | Name | Date |
|---|---|---|
| 2,432,344 | Sinclair | Dec. 9, 1947 |
| 2,432,520 | Ferro | Dec. 16, 1947 |
| 2,432,872 | Ferro | Dec. 16, 1947 |
| 2,432,873 | Ferro et al. | Dec. 16, 1947 |
| 2,448,257 | Evans | Aug. 31, 1948 |
| 2,531,192 | Bergstrom | Nov. 21, 1950 |
| 2,531,356 | Evans | Nov. 21, 1950 |
| 2,546,625 | Bergstrom | Mar. 27, 1951 |
| 2,574,503 | Simpson | Nov. 13, 1951 |
| 2,643,216 | Findlay | June 23, 1953 |
| 2,684,124 | Hines | July 20, 1954 |
| 2,684,867 | Berg | July 27, 1954 |
| 2,684,870 | Berg | July 27, 1954 |
| 2,684,927 | Bergstrom | July 27, 1954 |
| 2,684,929 | Schutte | July 27, 1954 |
| 2,692,225 | Findlay | Oct. 19, 1954 |